United States Patent
Birkenbach et al.

(10) Patent No.: US 6,315,058 B1
(45) Date of Patent: Nov. 13, 2001

(54) SOIL-WORKING IMPLEMENT HAVING QUICK-CHANGE SWEEP DESIGN

(75) Inventors: Eugen J. Birkenbach, Kildeer, IL (US); Donald J. Sanderson, Puslinch (CA)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/636,430

(22) Filed: Aug. 10, 2000

(51) Int. Cl.$^7$ ................................................. A01B 35/26
(52) U.S. Cl. ........................... 172/762; 172/753; 37/457
(58) Field of Search .................... 172/762, 772, 172/753, 769, 749, 751; 37/457, 456, 455, 460; 403/379, 374

(56) References Cited

U.S. PATENT DOCUMENTS

| | | | |
|---|---|---|---|
| 1,345,209 | * | 6/1920 | Martin . |
| 3,357,117 | * | 12/1967 | Petersen . |
| 3,722,932 | * | 3/1973 | Dougall . |
| 4,154,483 | * | 5/1979 | Hollingworth . |
| 4,231,173 | * | 11/1980 | Davis . |
| 4,267,653 | * | 5/1981 | Hahn et al. . |
| 4,282,665 | * | 8/1981 | Fletcher et al. . |
| 4,638,868 | * | 1/1987 | Johnson et al. . |
| 4,681,335 | | 7/1987 | Ledermann et al. . |
| 4,696,349 | | 9/1987 | Harwood et al. . |
| 4,700,784 | | 10/1987 | Wiebe et al. . |
| 4,762,372 | * | 8/1988 | Rassmann et al. . |
| 4,781,254 | * | 11/1988 | Johnson . |
| 4,819,737 | | 4/1989 | Frase . |
| 4,867,248 | * | 9/1989 | Robertson et al. . |
| 4,871,032 | * | 10/1989 | McGuire et al. . |
| 5,259,461 | | 11/1993 | Cochrane . |
| 5,465,796 | | 11/1995 | Buescher et al. . |

FOREIGN PATENT DOCUMENTS

| 216144 | * | 12/1957 | (AU) | .................................... 172/753 |
| 106027 | * | 12/1938 | (AU) | .................................... 172/762 |

* cited by examiner

*Primary Examiner*—Victor Batson
(74) *Attorney, Agent, or Firm*—Nilles & Nilles, S.C.

(57) ABSTRACT

An improved soil-working implement. The implement comprises a shank having a free-end portion; a one-piece adapter defining a recess, wherein the adapter is removably affixed to the shank free-end portion; a one-piece shovel; and an elastomeric element frictionally removably retained within the recess of the adapter.

3 Claims, 2 Drawing Sheets

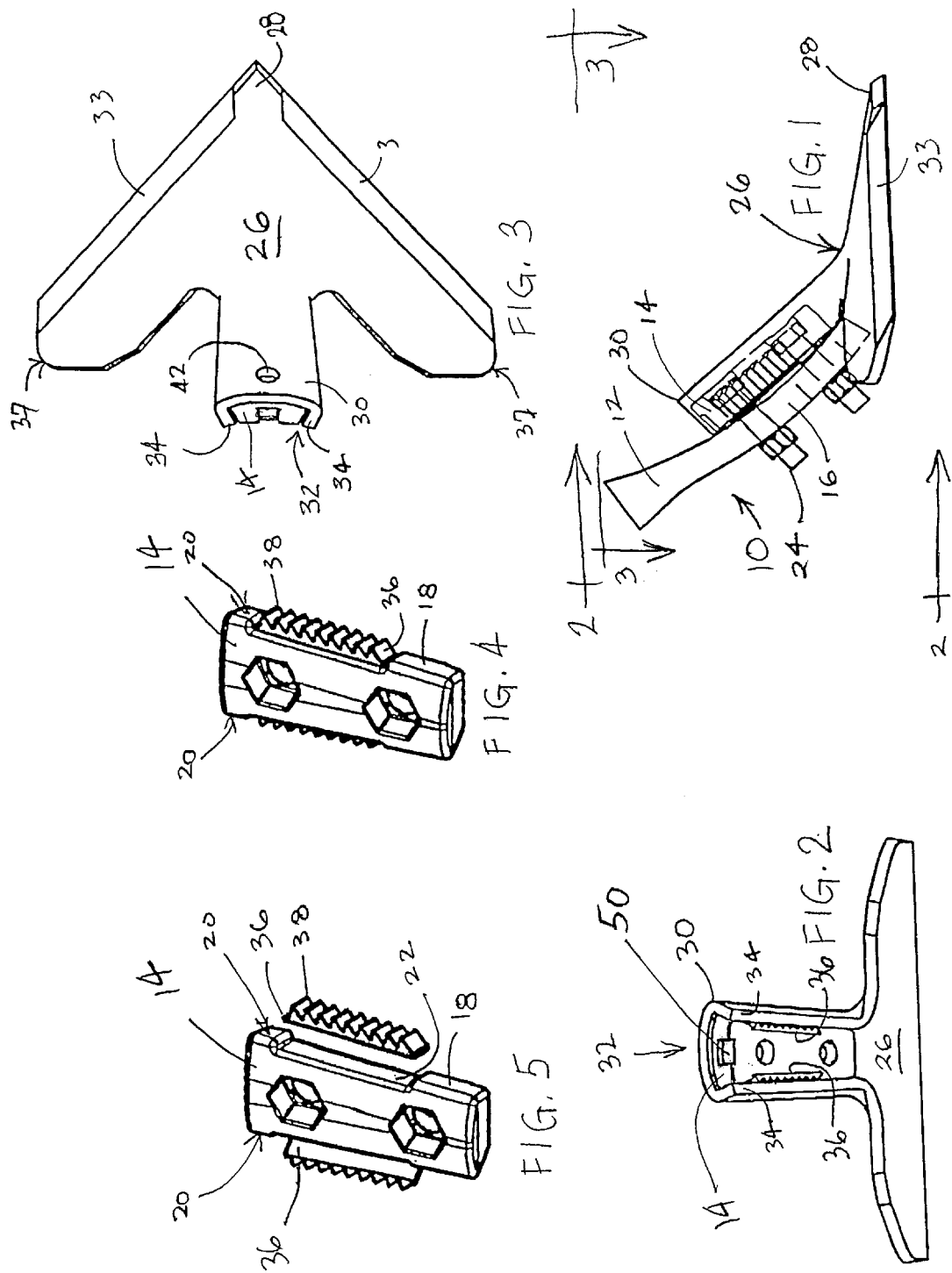

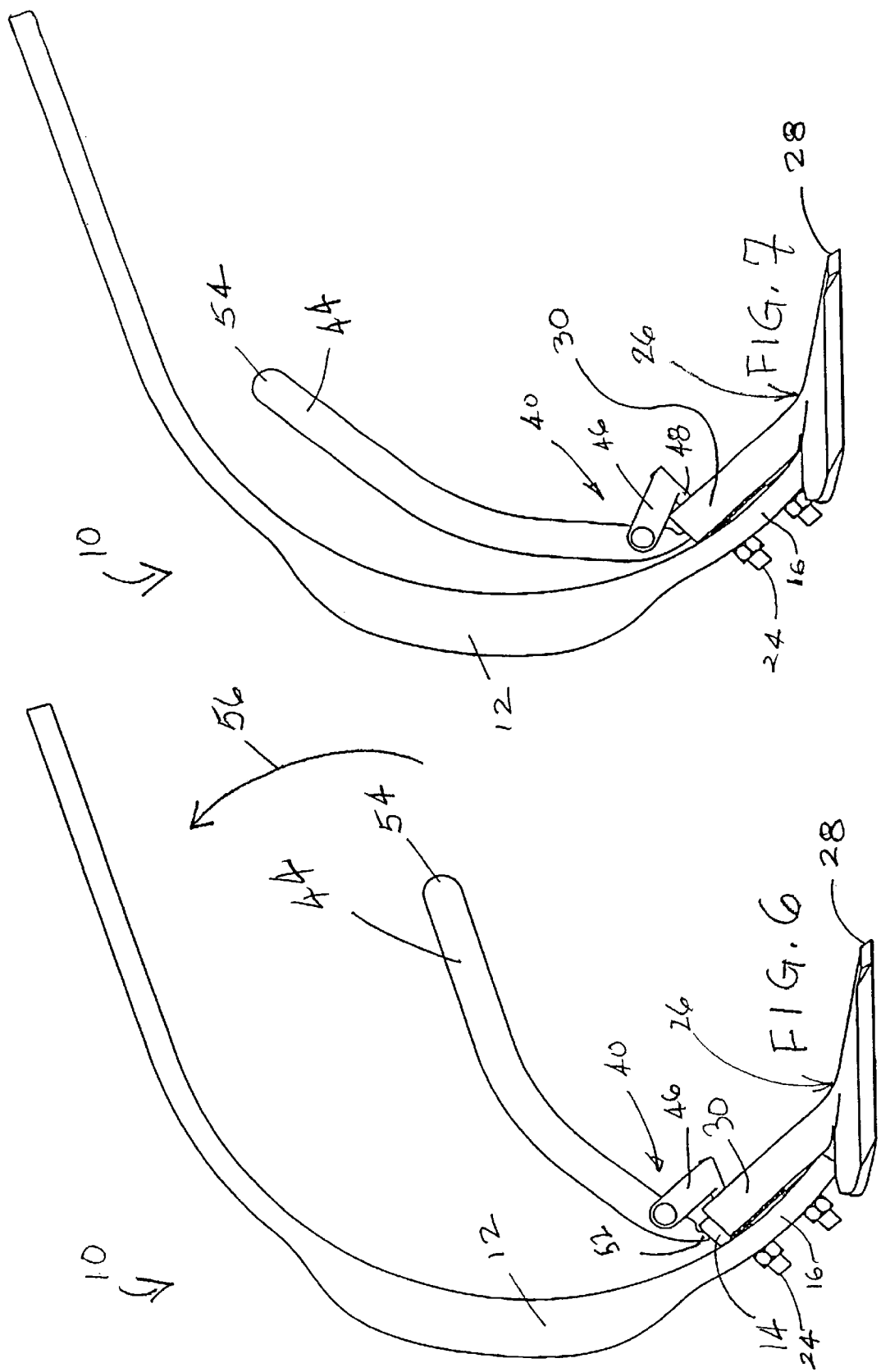

SOIL-WORKING IMPLEMENT HAVING QUICK-CHANGE SWEEP DESIGN

TECHNICAL FIELD OF THE INVENTION

The present invention, in general, is directed to the field of soil-working implements and, more particularly, is directed to a quick-change design for a sweep or shovel element for a conventional soil-working implement.

BACKGROUND OF THE INVENTION

Efficient and successful farming operations require careful cultivation of the soil between the rows of planted or growing crop. For example, the soil must be aerated or rearranged and residues from prior crops remaining in the field must be cut or mulched. Weed populations must be controlled by uprooting or cutting beneath the ground level.

Field cultivators, and/or chisel plows, are conventional soil-working implements, which are typically equipped with shanks, often called tines, to which the soil-engaging components, usually called sweeps or shovels, are attached.

Historically, row-upon-row of a plurality of the shovel (or sweep) elements have been fastened to respective shanks of conventional soil-engaging implements and held in place by one or more fasteners, such as plow bolts. Two such bolts are generally used. See, for example, U.S. Pat. No. 5,259,461 to Cochrane, assigned to Case Corporation.

While chisel plows are mostly used for primary tillage, field cultivators are used for secondary tillage, seed-bed preparation, weed control and incorporation of chemicals.

Since a function of the sweeps is to work the ground, it can be appreciated that when in use, the sweeps and bolts are typically submerged in soil as they are urged by the shanks, which are typically made of heat-treated spring steel, to pass through the soil.

Abrasive soils, such as sandy or rocky soils, cause shovels as well as plow bolts to wear out sooner than would be the case if the soil did not contain abrasive components.

Moreover, when sizable rocks are met, considerable damage can result to sweeps as well as to plow bolts.

Accordingly, the quick and efficient changing of sweeps and/or plow bolts is a matter of concern to conventional farmers because such changes, with state-of-the-art technology, is both time consuming and labor intensive.

"Knock-on" sweeps, which rely on mated tapered surfaces portions of a shank and a shovel to hold the shovel on the shank, have used at least one pin to temporarily hold the sweep onto the shank. See, for example, U.S. Pat. No. 5,465,796 to Buescher.

Moreover, in recent years, "knock-on" sweeps have been developed in various configurations. Usually, current sweep designs do not require the use of any fasteners. Rather, the sweep is driven by impact force onto a tapered adaptor which is fastened to the shank. In an alternative design, the shank itself is tapered to accept the sweep.

While some of the state-of-the-art sweep/shovel element designs offer secondary fastening mechanisms including pins, hooks, and so forth, most "knock-on" sweep/shovel elements rely strictly on the friction between two conventionally-matched steel parts.

As noted above, soil-engaging components, especially shovels and plow bolts, are usually made of a durable, economical metal; and steel is typically the metal of choice.

Due to unavoidable manufacturing variations, inadvertent sweep mis-installation, and/or currently ineffective sweep-attachment design, the reliability and performance of state-of-the-art "knock-on" sweeps is not satisfactory to reputable agricultural implement manufacturers!

Presently, too many sweeps fall off due to looseness and/or vibration and are lost. Occasionally, those that are not lost may become imbedded in a tractor tire.

In the 1,000 to 5,000 acre fields of the Dakotas, for example, such failure of shovels to remain attached to shanks, especially during 14-hour days when farmers are concerned with meeting planting and/or harvesting deadlines, can result in catastrophic effects.

The present invention, however, solves the "problem" of the shovels (or sweeps) falling off undesirably from their associated shanks of current soil-engaging implements.

The sweep-attachment design of the invention, described in full below, has overcome the shortcomings of the prior art sweep-attachment designs by incorporating relatively-stiff elastomeric materials, such as commercially-available, pliable thermoplastic polymeric elements made of rubber into the sweep-attachment design.

A preferred embodiment of the invention, illustrated herein, presents the novel elastomeric element as releasably retained in a recess of an adapter element which in turn is releasably attached to an associated shank. In this way, the attached shovel is not only held firmly in place for as long as desired, but also manufacturing variations are bridged and any looseness or vibration is avoided.

The adaptor disclosed and described herein is especially designed to fit shanks which are either curved or straight in their sweep-attaching area. The step of attaching a "knock-on" type sweep (or shovel) element to a shank of current agricultural implements is often rather difficult.

To overcome any such problem, a special, suitable tool (illustrated herein) is used to enable quick-attachment of a sweep element to an associated shank in a matter of seconds and with very little effort.

SUMMARY OF THE INVENTION

The present invention is an improved soil-working implement, which includes several components. A first component of the present invention is a shank having a free-end portion that is disposed downwardly toward the soil.

Another element of the soil-working implement of the invention is a one-piece adapter. The adapter defines an edge portion, a tapered surface, and a recess disposed along the edge margin. The adapter is removably affixed to the free-end of the shank.

Yet another element of the soil-working implement of the invention is a one-piece shovel. The shovel defines an integral soil-engaging end and an integral bracket which is in distal relation to the soil-engaging end. The bracket, in turn, defines a walled channel. The channel wall of the bracket defines a tapered surface.

The adapter is dimensioned to fit snugly within the channel when the tapered surfaces of the adapter and channel are in contact. The adaptor is made of a durable metal such as commercially-available zinc-plated steel which is manufactured so as to provide a frictional surface for retaining the shovel onto the adaptor when the tapered surfaces of the adapter and bracket channel are in contact.

Still another element of the soil-working implement of the present invention is an elastomeric element, made from a suitable commercially-available pliable thermoplastic polymer such as rubber. The elastomeric element is frictionally and removably retained within the recess of the adapter.

The elastomeric element defines a plurality of integral fingers disposed outwardly of the adaptor edge margin when the elastomeric element is disposed within the adapter recess. When thus-disposed within the recess, the plural fingers are further disposed toward the opening of the shovel channel. The plural fingers of the elastomeric provide an additional frictional surface for retaining the shovel onto the adapter when the plural fingers contact the tapered surface of the bracket channel and the tapered surfaces of the adapter and shovel bracket channel are in contact.

The result, after the adapter is inserted and frictionally retained with the channeled bracket of the shovel, is that the adapter and plural fingers of the elastomeric element cooperate to frictionally retain the shovel onto the free-end portion of the shank.

BRIEF DESCRIPTION OF THE DRAWINGS

FIG. 1 is a side elevation view;

FIG. 2 is a back view, taken along the plane 2—2 of FIG. 1, with some of the elements of FIG. 1 removed;

FIG. 3 is a top plan view, taken along the plane 3—3 of FIG. 1, with some of the elements of the invention removed;

FIG. 4 is a perspective view, on an enlarged scale relative to FIG. 1, showing two of the elements of the present invention, assembled;

FIG. 5 is an exploded view of the elements depicted in FIG. 4;

FIG. 6 is a side elevation view of the above-described components of the present invention, on a reduced scale relative to FIGS. 1–5 and including an installation tool therefor; and FIG. 7 is a side elevation view, based on FIG. 6, and showing a later sequence of the installation tool when used in combination with the present invention.

In the FIGURES, like reference numbers are used to denote like elements.

DETAILED DESCRIPTION OF THE PREFERRED EMBODIMENT

While the present invention is susceptible to embodiment in various forms, there is shown in the accompanying drawings and hereinafter described in detail, a presently preferred embodiment of the present invention. Upon reading this patent specification, various equivalents of elements shown herein will come to the minds of those skilled in the art. For that purpose, it is to be understood that the accompanying embodiments of the present invention are to be considered as merely an exemplification of the invention without limitation to the specific embodiments illustrated and described herein.

Referring to FIG. 1, there is shown an improved soil-working implement 10 comprising a shank 12 and a one-piece adaptor 14. The shank 12, which is preferably elongated and arcuate in shape, has a free-end portion 16 that is disposed downwardly toward the soil (FIGS. 6 and 7). The one-piece adapter 14, which is also preferably elongated, defines at least one edge margin 18 (FIGS. 4 and 5), at least one tapered surface 20, and at least one recess 22 disposed along the edge margin 18. Adapter 14 preferably defines a pair of integral longitudinally-disposed opposite edge margins 18, wherein the edge margins 18 together define a pair of spaced-apart surfaces 20 that are tapered inwardly along the length of the adapter 14, wherein each of the edge margins 18 further defines an elongated recess 22 therein. Each recess 22 is disposed substantially along the length of its corresponding adapter edge margin 18. Adapter 14 is removably affixed to the free-end portion 16 of shank 12 by a number of threaded fasteners 24.

The soil-working implement 10 further includes a one-piece sweep or shovel 26. The shovel 26, preferably manufactured from a durable economical metal such as steel, defines an integral soil-engaging end 28 and an integral bracket 30 in distal relation to the soil-engaging end 28. The bracket end 30 is preferably elongated, and defines an integral walled channel 32 (FIGS. 2 and 3), which is preferably correspondingly elongated. The elongated channel 32 thus defines spaced-apart side walls 34. The channel walls 34 thus define a pair of facing surfaces that are tapered longitudinally (see FIG. 2) along the axis of the walled channel 32. The adapter 14 is dimensioned to fit snugly within the channel 32 when disposed longitudinally therein, such that the tapered surfaces 20 of the adapter 14 and channel 32 (FIG. 2) are in contact. The adapter 14 is manufactured from a commercially-available durable metal, preferably steel, and provides a frictional surface for retaining the bracket end 30 of the one-piece shovel 26 onto the adapter 14 when the tapered surfaces of the adapter 14 and bracket channel 32 are in contact.

The illustrated sweep 26 (FIGS. 1–3) includes beveled edge margins 33 and a relatively flat underside surface 35 (FIG. 2), which those skilled in the art may want to curve slightly to achieve desired effects. For example, we have considered the benefits of using a slightly curved underside design (not shown), in connection with our sweep design, for the purpose of gently drawing each sweep downwardly into the soil as the soil-working implement moves the sweeps through the soil. The present invention may be used in connection with the row crop cultivator described and disclosed in U.S. Pat. No. 4,819,737 to Frase, assigned to J.I. Case Company of Racine, Wis., which patent is incorporated by reference. It can be appreciated that the invention may be used in combination with a conventional cultivator wherein a great number of sweeps may be involved. Also note that we have designed the trailing edge portions 37 of the sweep 26 to be rounded-off to reduce the likelihood of injury to people and damage to clothing.

The improved soil-working implement of the present invention further includes at least one elastomeric element 36, preferably elongated and made of rubber. The present invention preferably includes a pair of such elements 36, each of which is longitudinally disposed and frictionally removably retained (FIGS. 4 and 5) within a corresponding recess 22 of the adapter 14. The elastomeric element 36 is provided with a plurality of integral fingers 38 that are disposed outwardly of the adapter edge margin 18 when the elastomeric element 36 is disposed within adapter recess 22 (FIG. 4). When adapter 14 is urged into surface-contacting engagement within bracket channel 32 (FIG. 2), the fingers 38 are caused to flex toward the opening of channel 32, which further serves to retain sweep 26 onto adapter 14. The plural fingers 38 of the elastomeric element 36 thus provide an additional frictional surface for retaining the shovel 26 onto the adapter 14 when the tapered surfaces 20 of the adapter 14 and bracket channel 32 are in contact.

The present invention will now be discussed in combination with an installation tool 40 (FIGS. 6 and 7). Please note that the sweep bracket 30 defines an aperture 42 (FIG. 3) that is spaced in distal relation to the soil-engaging end 28 of the shovel 26.

Th installation tool 40 comprises an elongated handle 44 and a U-shaped bracket 46 pivotally connected to an end portion 52 of handle 44. U-shaped bracket 46 defines an integral post or finger 48 (FIG. 7) that is so dimensioned as to be longitudinally disposable and fit snugly within the shovel aperture 42. Also please note that adapter 14 includes an indent or recess 50 (FIG. 2) on the outwardly-disposed end-portion of adapter 14. The operative end 52 (FIG. 6) of handle 44 is dimensioned to fit into indent 50, to reduce the likelihood of operative end 52 of handle 44 moving off-of-center (FIG. 2), as adapter 14 is urged into channel 32 when the tool 40 is used as desired.

In operation, the post 48 is disposed into aperture 42, such that operative end 52 of handle 44 is in contact with adapter 14. The opposite end 54 of the elongated handle 44 can then be used, by moving the handle 44 in the direction of the curved arrow 56 (FIG. 6), to urge the adapter 14 longitudinally (FIG. 2) into channel 32, resulting in snug engagement of the contacting surfaces of adapter 14 and the elements 36 within bracket 30, resulting in desired retention of shovel 26 onto adapter 14. Indeed, our data suggests that sweeps 26 are held onto shanks 12 with a force of 2000 to 6000 pounds.

What has been illustrated and described is an improved soil-working implement. The foregoing specification and drawings are intended to be illustrative and not to be taken as limiting. Thus, alternatives, changes, or modifications may become apparent to those skilled in the art upon reading the foregoing description. Other variations of the present invention are of course possible, and additional features will readily present themselves to those skilled in the art upon reading the foregoing. Accordingly, such alternatives, changes or modifications are to be considered as forming a part of the present invention insofar as they fall within the spirit and scope of the appended claims.

What is claimed is:

1. An improved soil-working implement comprising:
   a shank having a free-end portion that is disposed downwardly toward the soil;
   a one-piece adapter defining an edge margin, a tapered surface, and a recess disposed along the edge margin, wherein the adapter is removably affixed to the free-end portion of the shank;
   a one-piece shovel defining an integral soil-engaging end and an integral bracket in distal relation to the soil-engaging end, wherein the bracket defines a walled channel, wherein the channel wall defines a tapered surface, wherein the adapter is dimensioned to fit snugly within the channel when the tapered surfaces of the adapter and channel are in contact, wherein the adapter is dimensioned to provide a frictional surface for retaining the shovel onto the adapter when the tapered surfaces of the adapter and bracket channel are in contact; and
   an elastomeric element frictionally removably retained within the recess of the adapter, wherein the elastomeric element defines a plurality of integral fingers disposed outwardly of the adapter edge margin when the elastomeric element is disposed within the adapter recess, wherein the plural fingers of the elastomeric element provide an additional frictional surface for retaining the shovel onto the adapter when the plural fingers contact the tapered surface of the bracket channel and the tapered surfaces of the adapter and bracket channel are in contact, wherein the adapter is removably frictionally retained within the channeled bracket of the shovel, whereby the adapter and the fingers cooperate to frictionally retain the shovel onto the free-end portion of the shank.

2. An improved soil-working implement comprising:
   an elongated, arcuate shank having a free-end portion that is disposed downwardly toward the soil;
   an elongated one-piece adapter defining a pair of integral longitudinally-disposed opposite edge margins, wherein the edge margins together define a pair of spaced-apart surfaces that are tapered inwardly along the length of the adapter, wherein each of the edge margins further defines an elongated recess therein, wherein each recess is disposed substantially along the length of its corresponding adapter edge margin, wherein the adapter is removably affixed to the free-end portion of the shank;
   a one-piece shovel defining an integral soil-engaging end and an integral bracket end in distal relation to the soil-engaging end, wherein the bracket end is elongated and defines a correspondingly elongated integral channel having spaced-apart side walls, wherein the channel side walls define a pair of facing surfaces that are tapered along the length of the channel, wherein the adapter is dimensioned to be disposed longitudinally and fit snugly within the channel when the tapered surfaces of the adapter are in contact with the tapered surfaces of the channel, wherein the adapter provides a frictional surface for retaining the shovel onto the adapter when the tapered surfaces of the adapter are in contact with the tapered surfaces of the channel; and
   a pair of elongated resilient elastomeric elements, wherein each elastomeric element is longitudinally-disposed and frictionally removably retained within a corresponding one of the adapter recesses, wherein each of the elastomeric elements defines a plurality of integral fingers disposed outwardly of a corresponding one of the adapter edge margins when the elastomeric elements are longitudinallydisposed and retained within their respective adapter recesses, wherein the plural fingers of both of the elastomeric elements together provide an additional frictional surface for retaining the shovel onto the adapter when the plural fingers of both of the recess-retained elastomeric elements are in contact with the tapered surfaces of the channel of the bracket end of the shovel and the tapered surfaces of the shovel channel are in contact with the tapered surfaces of the adapter, wherein the adapter is longitudinally disposed and removably frictionally retained within the channel of the shovel, whereby the channel tapered walls, the adapter edge margins, and the fingers of both of the elastomeric elements collectively cooperate to frictionally retain the shovel onto the free-end portion of the shank.

3. In combination with an installation tool comprising an elongated handle and a U-shaped bracket pivotally connected to an end portion of the handle, an improved soil-working implement comprising:
   a shank having a free-end portion that is disposed downwardly toward the soil;
   a one-piece adapter defining an edge margin, a tapered surface, and a recess disposed along the edge margin, wherein the adapter is removably affixed to the free-end portion of the shank;
   a one-piece shovel defining an integral soil-engaging end and an integral bracket in distal relation to the soil-engaging end, wherein the shovel bracket defines a walled channel and an aperture spaced in distal relation to the soil-engaging end, wherein the channel wall defines a tapered surface, wherein the U-shaped bracket defines an integral post dimensioned to be disposable and fit snugly within the shovel aperture, wherein the adapter is dimensioned to fit snugly within the channel when the tapered surfaces of the adapter and channel are in contact, wherein the adapter is dimensioned to provide a frictional surface for retaining the shovel onto the adapter when the tapered surfaces of the adapter and shovel bracket channel are in contact; and an elastomeric element frictionally removably retained within the recess of the adapter, wherein the elastomeric element defines a plurality of integral fingers disposed outwardly of the adapter edge margin when the elastomeric element is disposed within the adapter recess, wherein the plural fingers of the elastomeric element provide an additional frictional surface for retaining the shovel onto the adapter when the plural fingers contact the tapered surface of the shovel channel and the tapered surfaces of the adapter and shovel channel are in contact, wherein the adapter is removably frictionally retained within the shovel channel, whereby, when the post is disposed within the shovel aperture such that the U-bracketed end portion of the handle is in contact with the adapter, the opposite end of the elongated handle can be used to urge the adapter into snug engagement within the shovel channel, whereby the adapter and the fingers cooperate to frictionally retain the shovel onto the free-end portion of the shank.

\* \* \* \* \*